United States Patent [19]

Rias

[11] Patent Number: 5,246,516
[45] Date of Patent: Sep. 21, 1993

[54] CONTINUOUS PROCEDURE FOR OBTAINING PANELS CLAD ON AT LEAST TWO ADJACENT FACES

[75] Inventor: Jean-Claude Rias, Villenes sur Seine, France

[73] Assignee: Isover Saint-Gobain, Courbevoie, France

[21] Appl. No.: 771,840

[22] Filed: Oct. 8, 1991

Related U.S. Application Data

[63] Continuation of Ser. No. 510,837, Apr. 18, 1990, abandoned.

[30] Foreign Application Priority Data

Apr. 27, 1989 [FR] France .................................. 89 05581

[51] Int. Cl.$^5$ .............................................. B32B 31/06
[52] U.S. Cl. .................................... 156/202; 156/212; 156/216
[58] Field of Search ............... 156/202, 216, 247, 324, 156/461, 212, 463, 311

[56] References Cited

U.S. PATENT DOCUMENTS

| | | | |
|---|---|---|---|
| 1,956,091 | 4/1934 | Carson | 156/282 |
| 2,213,249 | 9/1940 | Kelley | 156/324 X |
| 3,671,355 | 6/1972 | Paymal | 156/324 |
| 4,507,347 | 3/1985 | Lupton | 428/247 |
| 4,666,761 | 5/1987 | Stamper et al. | 428/247 |
| 4,916,004 | 4/1990 | Ensminger et al. | 428/247 |
| 4,925,512 | 5/1990 | Briand | 156/202 |

FOREIGN PATENT DOCUMENTS

| | | | |
|---|---|---|---|
| 2814471 | 1/1979 | Fed. Rep. of Germany | 156/202 |
| 1299105 | 7/1989 | Fed. Rep. of Germany | 428/247 |
| 1420142 | 10/1965 | France | 156/202 |
| 2104448 | 3/1983 | United Kingdom | 156/216 |

Primary Examiner—Caleb Weston
Assistant Examiner—Richard Crispino
Attorney, Agent, or Firm—Oblon, Spivak, McClelland, Maier & Neustadt

[57] ABSTRACT

A continuous procedure for obtaining panels clad on at least two adjacent sides from a continuous band, including the steps of gluing cladding along a first face of the bands, holding the cladding in position until final gluing, gradually folding down the cladding along the side or sides of the band, gluing down the flaps and holding the cladding in position until final gluing. The invention applies to obtaining edged insulating panels.

9 Claims, 3 Drawing Sheets

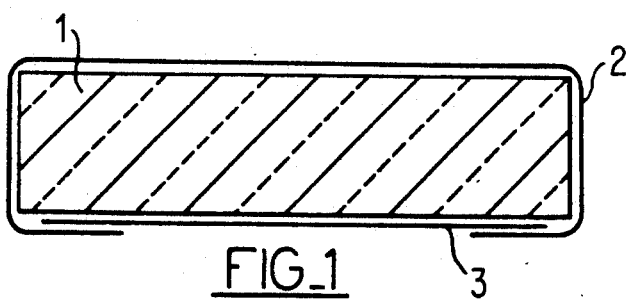
FIG_1
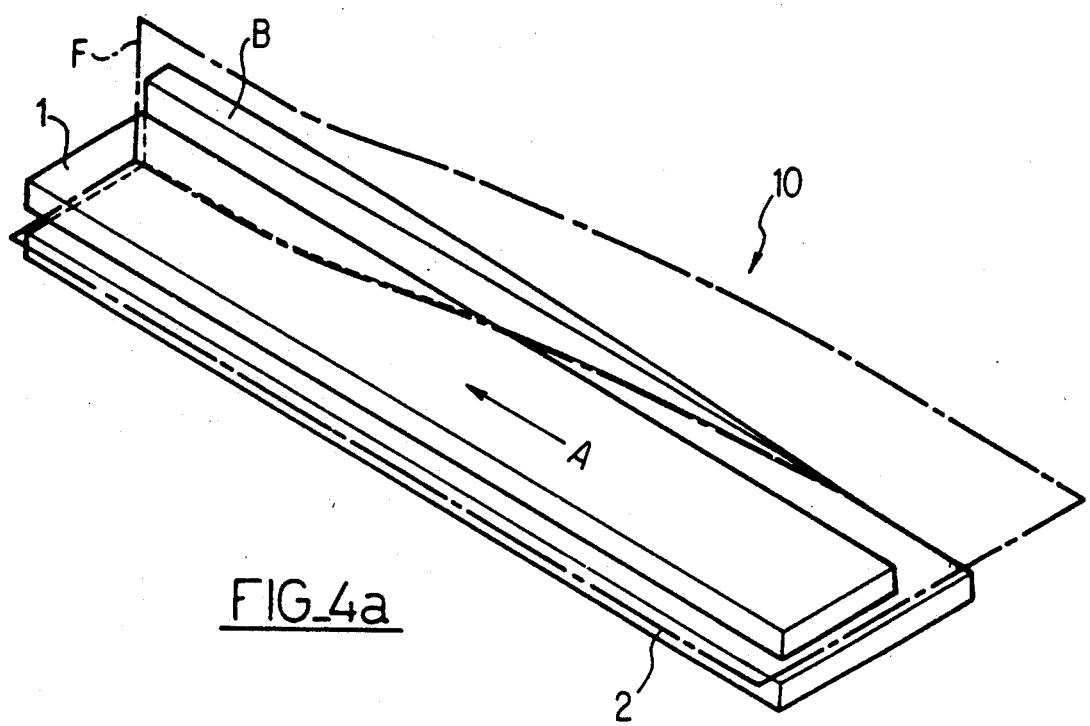
FIG_4a
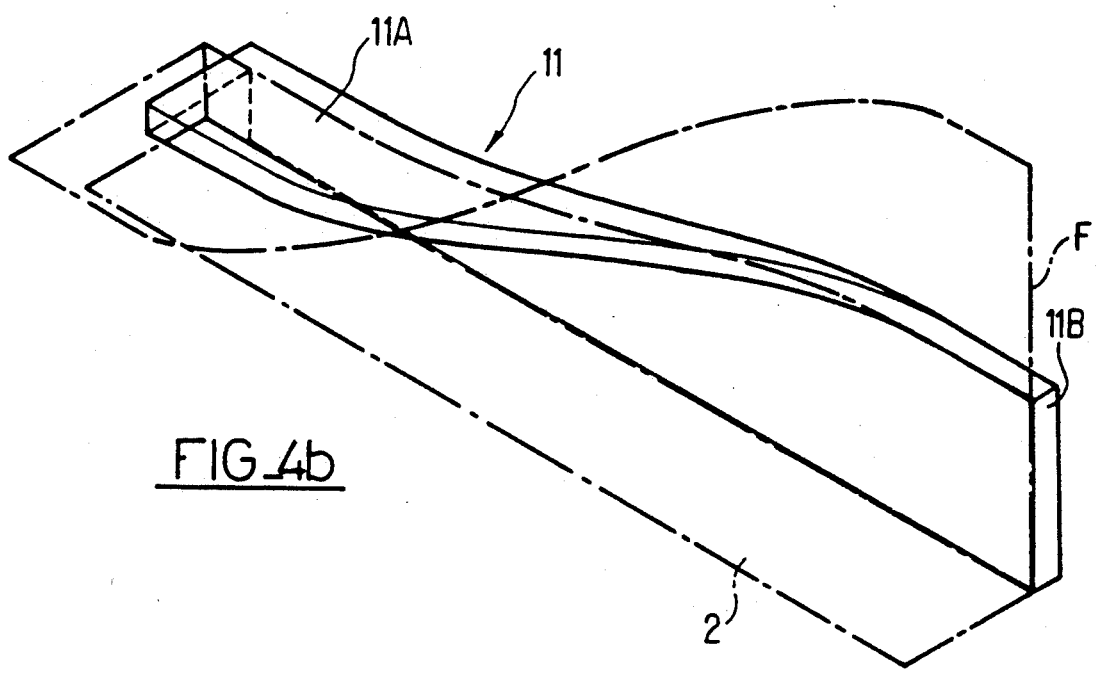
FIG_4b

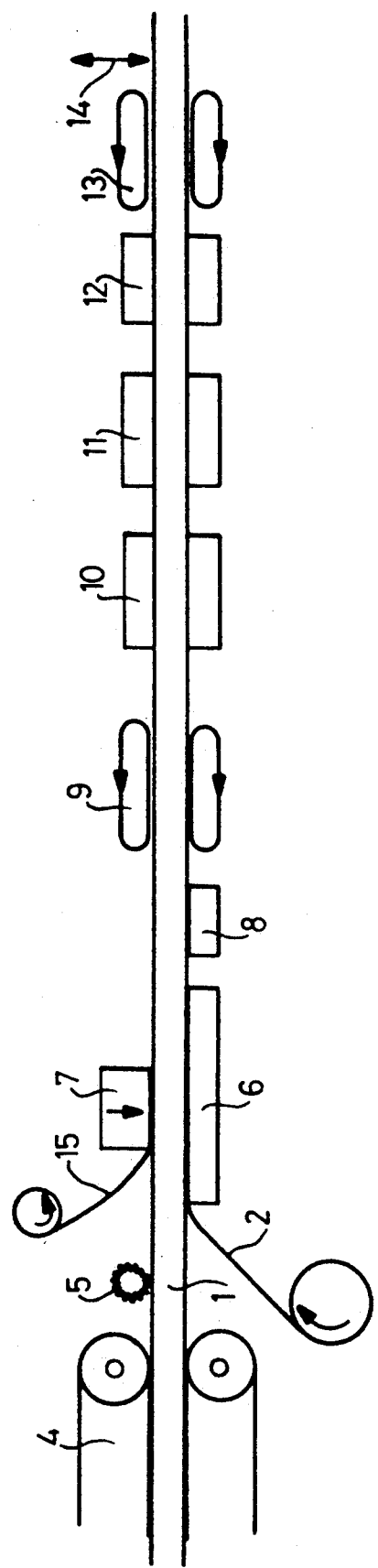
FIG_2

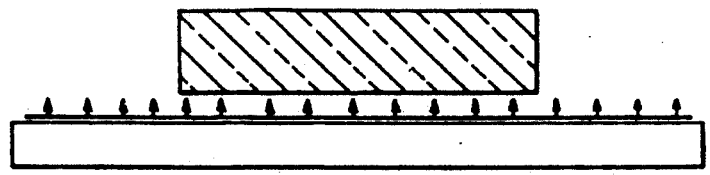
FIG_3a
FIG_3b
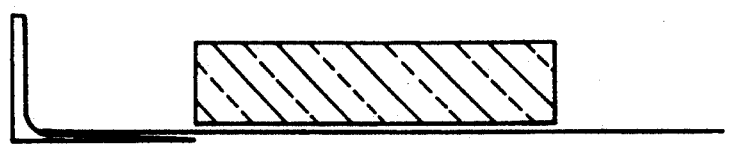
FIG_3c
FIG_3d
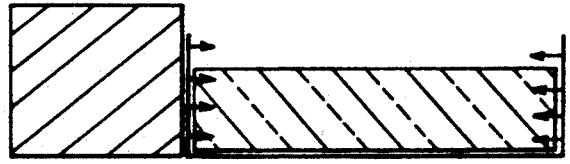
FIG_3e
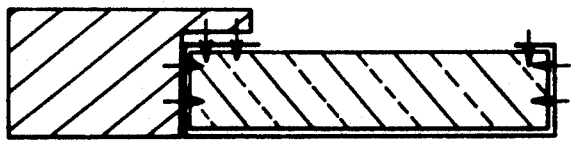
FIG_3f
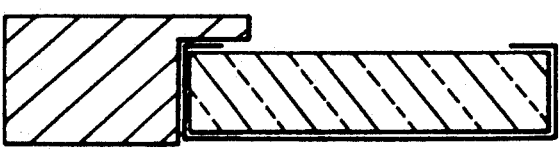
FIG_3g

CONTINUOUS PROCEDURE FOR OBTAINING PANELS CLAD ON AT LEAST TWO ADJACENT FACES

This application is a continuation of application Ser. No. 07/510,837, filed on Apr. 18, 1990, now abandoned.

BACKGROUND OF THE INVENTION

1. Field of the Invention

The invention concerns a continuous procedure for obtaining panels clad on at least two edged adjacent sides, particularly rigid or semi-rigid mineral wool panels one face of which has a cladding edged on one or two adjacent sides, used as ceilings, for example, in which case they are installed between purlings or on a suspended framework or when used as claddings—installed between vertical sections.

2. Background of the Related Art

For the soundproofing and thermal insulation of commercial, tertiary or industrial buildings, it is common practice to use relatively rigid panels, in glass wool or rock wool, clad with a vapor barrier, possibly in conjunction with a decorative cladding. A typical example is a rigid glass wool panel clad with a vapor barrier in aluminized and lacquered kraft paper, the vapor barrier being glued onto a panel reinforcement layer of glass fiber of the mesh type.

To improve the mechanical resistance of such panels and also their aesthetic appearance, it is possible to cover one or both edges with edging consisting of folding down the cladding along an angle and gluing down the part which protrudes onto the rear of the panel. Edging also facilitates handling the panels since it avoids physical contact between the hands and the mineral wool, which is frequently an unpleasant sensation. Lastly, inasmuch as the cladding itself can withstand such treatment, the edging process permits washing the panels, water no longer being able to infiltrate through the sides of the glass wool layer.

Although the advantages of the edging process are many and immediately evident, execution is not so obviously simple. Indeed, the panels which this invention deals with are fairly inexpensive products, essentially used for ceilings over large surface areas, and where the price to the customer cannot be increased considerably to cover the extra cost of providing the edging.

This basic requirement of an inexpensive process cannot be satisfied when the mineral wool panels are clad in a separate operation, as is usually the case in this type of operation, i.e., on panels ready cut to the definitive dimensions. Doing the job in separate stages has the major disadvantage of doubling the number of times the panels are handled, which requires more handling means, both in terms of tools and personnel. In addition, it is very difficult to obtain a tension of the cladding sufficient to avoid forming ugly creases, yet low enough not to cause tearing.

In addition, carrying out the cladding directly on the production line poses a number of difficulties. Firstly, the mineral wool band issuing from the polymerization oven as a general rule is as wide as the width of several panels, hence the need exists to have an extra-wide conveyor enabling spacing the panels apart in order to edge the sides in the central part of the mineral wood band. Another difficulty stems from having to pull the cladding to stretch it over the edge, yet without pulling the fibers of the mineral wool layer. One can, to a considerable degree, avoid damaging the mineral wool layer by using long fibers and a better performing binder, but this adds considerably to the cost of the process.

SUMMARY OF THE INVENTION

An object of this invention is, by means of a continuous process, to obtain panels clad on at least two adjacent faces from a continuous band, or at least a band of very great length compared to the length of the panels, said panels particularly being panels of mineral wool, the first face of which is fitted with a cladding edged on at least one of the sides adjacent to this first face.

In the process according to the invention the speed at which the mineral wool band feeds past the cladding application and gluing device is constant during the steps of gluing the cladding onto a first face of the continuous band, namely the mineral wool band, and the cladding is gradually folded down along the edges or edges adjacent to the first face, after which the flaps are glued down.

A particularly important point of the process according to the invention is the constant feed speed from one end of the operations to the other, so that no jerkiness occurs, which is known to cause deformation and tearing of the cladding. Also, the process avoids pulling the mineral fibers since the mineral wool band enters and leaves the cladding zone at the same speed. To ensure this constant feed speed, a slight tension is applied to the continuous band after gluing in order to compensate for loss of speed due to friction with the forming and gluing devices. A case where implementation of this characteristic is particularly advantageous is when the band feed speed is controlled by the speed of the line. In this case, the band is not only drawn by is also pushed by the following part which is, for example, produced in a continuous uninterrupted way, as in the case in a mineral wool production plant.

The other major characteristic of the process according to the invention is the fact that the edging operation starts only after final gluing on the main face. The term "final gluing" in the sense of the invention refers to a state signifying an advanced state of gellification when the glue has set so that the cladding does not come away when the application device is removed.

This characteristic implies a separation in time of the main face gluing stage and the edge gluing stage. A new layer of glue can be applied at this latter stage, or better still, a glue can be used for the entire cladding which reacts to heat several times, or in any case which does so at least twice. The cladding can thus include a glue layer formed by a layer of polyethylene which retains its adhesiveness even if heated and cooled many times. The layer of glue can also consist of a "hot melt" type layer.

For a better surface condition of the edges, it is then advantageous to fold down the flaps fully and start reheating the glue only after the folds have been placed in their final position.

To accelerate the process when using a multi-heat-reacting glue, it is advantageous for the devices used to hold the cladding in position be cooled so that the polyethylene layer is quickly brought to a temperature below its melt temperature. If this cooling does not take place, in view of the high speeds of a mineral wool production line, the cladding zone can reach a length of 10 meters, for example, which may be incompatible with the size of the building holding the production line.

No folds are found on products obtained with the process according to the invention. It goes without saying that their aesthetic appearance is further enhanced by the main face being smoothed by application of a glass fiber mesh, the smoothing being preferably carried out in a binder polymerizing oven in conformity with the teachings of French Patent No. 88.16895.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-section view of an edged insulating panel;

FIG. 2 is a block diagram of a production line for implementation of the process according to the invention;

FIGS. 3(a) through 3(g) are schematic illustrations of the main stages of the process according to the invention; and FIGS. 4(a) and 4(b) are perspective views of the forming devices shown in FIG. 2.

DETAILED DESCRIPTION OF THE PREFERRED EMBODIMENTS

FIG. 1 shows a cross-section view of an insulating panel. Mainly, it consists of a layer 1 of mineral wool composed of mineral fibers, particularly so-called "insulating" glass fibers, containing a polymerized binder. The density of layer 1 is, for example, from 15 to 80 kg/m3 inclusive, for a thickness of between 10 to 100 mm which generally corresponds to a range of products commercially classed as rigid or semi-rigid.

On three of its faces, and for a small part of the fourth, the panel is equipped with a cladding 2. This cladding has several functions: obviously, an aesthetic function (it covers the main face, i.e., the only face visible after assembly), a vapor barrier function (fundamental to preserve the roof which must not be rotted by vapor condensing behind the panel), possibly that of a barrier against liquid water (if one wishes to wash the panels occasionally). Lastly, a function of simplifying installation, inasmuch as the panels can be handled bare handed without discomfort. While contributing to these various functions, the edging also contributes to the rigidity of the panel and therefore its mechanical strength.

The main face of the panel also comprises, wedged between the layer of mineral wool and the cladding, a glass fiber mesh (not shown) intended to make uniform the surface of mineral wool layer 1 by smoothing and making it rigid, thus conferring improved mechanical characteristics. In addition, a mesh of glass fibers with a density of, for example, 35 to 150 grams/mm2, is less porous than mineral wood, which is favorable from the point of view of the strength of the cladding during gluing.

This cladding 2 consists, for example, from inside outwards, of a layer of glue in the form of a layer of polyethylene with a density of, for example, around 4 g/m2, a sheet of kraft paper and/or a sheet of aluminum, the aluminum face possibly having received one coat of varnish. Another example of a cladding which may be used is a "hot melt" or polyethylene layer/painted glass mesh system, with a sheet of aluminum placed between the layer of glue and the mesh. In fact, all polyethylene sheet/external cladding systems are suitable on condition the cladding can withstand the temperature necessary for activation of the hot-melting of the polyethylene and that it is able to fulfill the expected functions, particularly the vapor barrier function. To this main cladding 2 can also, if necessary, be added a dorsal cladding 3, for example, of kraft paper and/or aluminum so that the mineral wool is exposed only on the two small ends of the panel.

The cladding process according to the invention will now be described in reference to FIGS. 2 and 3.

On leaving the forming oven 4 in which the panel is smoothed, if necessary, the continuous band of mineral wool is divided into bands the width of the panels, for example using rotary saws 5. After being cut, the bands are spaced apart in order to allow between two bands a space sufficient for the cladding, i.e., at least twice the total length of the flaps F. All the bands are treated identically and at the same time, thus subsequent reference will be made to the treatment of only one of these. Cladding 2 is brought under a mineral wool band 1 (FIG. 3a). The wool band rests on a conveyor, not shown on the figures. The cladding is, for example, heated using a heating table 6, preferably one having a "Teflon" type non-stick surface, or any other equivalent means to activate the glue. To ensure good gluing, especially for the lightest products, pressure is applied using presser 7 acting on the face above band 1. At the time of this operation (FIG. 3b), the band feed speed is kept identical to that of the cladding.

As soon as the cladding is correctly applied (FIG. 3c), the mineral wool band 1 enters into the first cooling zone 8. This cooling can last 1 second, for example, which for a line speed of around 10 meters per minute corresponds to a zone approximately 60 cm long. The aim of the cooling is to bring the temperature of the cladding polyethylene layer to a value below the melt temperature. On completion of this first gluing, a slight traction is applied to the mineral wool band in order to ensure a speed equal to the initial speed at the cladding zone input, in spite of friction due to the pressing. Traction belts 9, for example, are used to do this.

The second operation can then commence, i.e., gluing on the sides. For this, one uses a cold forming machine 10 which enables bending to be carried out in a perfectly controlled manner and lifts the flaps F progressively in order to flatten them against the section of mineral wool (FIG. 3d). The forming machine 10 is shown schematically in FIG. 4a. It is important to note that its surface is smooth and continuous in order to avoid any unaesthetic deformation of the cladding. As can be seen, it consists of a blade B progressively lifted and angled by 90° with respect to the support S on which the band 1 rests during movement of the band in the direction A.

One can then reactivate the glue, but this time without heating the main face, in order to stop the cladding from sliding. This reactivation is obtained using the hot forming machine 11 which, as shown schematically in FIG. 4b, is in the form of a heating pad (FIG. 3e) whose downstream extremity 11A is turned at a right angle and progressively raised in order to carry out the second bending for complete edging (FIG. 3f). The hot forming machine 11 is preferably Teflon coated or equipped with an equivalent non-stick coating in order to avoid soiling the forming machine with the paint often used for the cladding. It is important to note that this forming machine surface is also perfectly continuous in order to avoid jerkiness.

The assembly once more enters a cooling zone 12 in order to finally set the cladding (FIG. 3g), now glued along all or part of the four faces of band 1.

As at the end of the first gluing operation, traction is applied by a belt 13 in order to keep the band speed constant.

Note that it is not necessary to glue the sides before gluing the top face, for the cladding is then perfectly held in place by its gluing on the underface of band 1 so that there is no likelihood of sliding.

The panels are then cut lengthwise, for example, using a cutter 14.

If necessary, the dorsal face of the panel is also fitted with cladding 15, for example, of aluminum with a heat-reactivating layer and applied directly by the presser 7 shown in FIG. 2.

The clad panels edged according to the invention are particularly suited for suspended ceilings with exposed frameworks as frequently seen in industrial buildings and, because of the great care taken in their aesthetic appearance, they can also be used for offices or commercial premises.

Obviously, numerous modifications and variations of the present invention are possible in light of the above teachings. It is therefore to be understood that within the scope of the appended claims, the invention may be practice otherwise than as specifically described herein.

What is claimed as new and desired to be secured by Letters Patent of the United States is:

1. A continuous process for producing panels clad on a plurality of sides by applying a cladding to sides of a continuous moving mineral wool band moving at a constant speed, wherein said cladding includes a cladding sheet having a glue capable of being activated at least twice, comprising the steps of:

applying the cladding sheet to one of the sides of the moving mineral wool band;

heating the cladding sheet so as to glue a portion of the cladding sheet on the one of said sides;

cooling the glue of the portion of the cladding sheet applied on the one of said sides to a temperature below the melt temperature thereof;

progressively folding a flap of the cladding sheet onto another of said sides adjacent said one of said sides, said folding step beginning after said cooling step has cooled the glue of said cladding sheet to below the melt temperature thereof;

again heating the cladding sheet except for the portion of the cladding sheet glued to the one of said sides, whereby the folded flap is glued on the another of said sides; and folding and gluing the flap onto an additional side of said band which is substantially parallel to said one of said sides and is adjacent said another of said sides.

2. The process of claim 1, wherein said glue comprises a layer of polyethylene.

3. The process of claim 1, including the step of pressing the cladding sheet onto the band following each of said gluing steps.

4. The process of claim 1, wherein said band comprises a smoothed mineral wool band.

5. The process of claim 1, including feeding said cladding sheet to said band at the same speed as that of said band.

6. The process of claim 1, including the step of applying tension to said band after each of said gluing steps.

7. The process of claim 1, including the step of gluing an additional cladding onto said additional side of said band which is parallel to said one side.

8. The process of claim 4, wherein said cladding comprises a laminate of polyethylene, kraft paper and aluminum foil, with said polyethylene layer comprising said glue.

9. The process of claim 4, wherein said cladding comprises a laminate of polyethylene and painted glass material, with said polyethylene layer comprising said glue.

* * * * *